United States Patent [19]

Howard

[11] 4,286,405

[45] Sep. 1, 1981

[54] TRAP FOR PIT VIPER

[76] Inventor: Walter E. Howard, 24 College Park, Davis, Calif. 95616

[21] Appl. No.: 140,155

[22] Filed: Apr. 14, 1980

[51] Int. Cl.³ ............................................. A01M 23/34
[52] U.S. Cl. ........................................................ 43/87
[58] Field of Search ................................ 43/87, 86, 85

[56] References Cited

U.S. PATENT DOCUMENTS

| 1,661,950 | 3/1928 | Krc ....................................... 43/86 |
| 1,805,317 | 5/1931 | Schober ............................... 43/86 |
| 1,899,641 | 2/1933 | Schwartz ............................. 43/86 |

FOREIGN PATENT DOCUMENTS 986734 4/1951 France ........................................ 43/87

Primary Examiner—Jimmy C. Peters
Attorney, Agent, or Firm—Lothrop & West

[57] ABSTRACT

An elongated cage is selective in entrapping only pit vipers, the cage being open at one end to provide ingress for the triangular-shaped head of a pit viper, the other end of the cage being closed to prevent egress. A noose is placed at the open end, the noose allowing the snake to insert its head therethrough but constricting the neck at the junction of the neck and the head as the snake attempts to withdraw its head and the base of the triangular head abuts the nether side of the noose. A stake and tether anchor the cage which is customarily located in paths believed to be frequented by snakes. Rodent odor is sometimes used to enhance the trap's capabilities.

6 Claims, 6 Drawing Figures

TRAP FOR PIT VIPER

BACKGROUND OF THE INVENTION

Although venomous snakes have a place in nature's scheme, their presence in close proximity to human habitations is frequently not desired. In some instances, encounters are dangerous, and even fatal, and where poisonous snakes are known to be present, most human beings feel uneasy and must perform even commonplace chores, such as gathering wood from the woodpile, with considerable caution and some degree of trepidation.

Most people, particularly farmers and ranchers, welcome the presence of non-venomous snakes for their help in keeping the rodent population in check; and, fortunately, most snakes are of this kind. The family Colubridae, represented by such familiar snakes as blacksnakes and garter snakes, contains nearly two thirds of the known species of snakes.

In the continental United States, however, there are four species of poisonous snakes. One of these is the coral snake, a snake which is seclusive and inoffensive and is really only dangerous when being handled.

The other three species of venomous snakes are the rattlesnake, the water moccasin (or cottonmouth) and the copperhead. These snakes are all pit vipers of the family Cotalidae. In addition to having a deep pit (hence the name pit viper) between the eyes and nostrils, pit vipers are distinguished by a flattened, triangular head. That is, the head is distinctly wider than the neck so that, speaking in mechanical or structural terms, the base of the triangular head protrudes transversely from opposite sides of the neck to provide, as it were, a pair of transversely projecting shoulders.

It is this unique characteristic on which the present trap relies to perform its function. Since only pit vipers possess this head configuration and since all pit vipers are venomous, only dangerous snakes are captured by the trap.

SUMMARY OF THE INVENTION

A small elongated cage is open at one end to provide an entrance for the snake's head and is closed at the other end to prevent egress. Opposite side walls, a top and a bottom ordinarily complete the cage. The cage material can be sheet metal or expanded metal or a combination of the two, and the trap is customarily tethered to a nearby stake to prevent the snake's escape by carrying the trap away.

A pair of wires is pivotally mounted at one end on opposite sides of the open entrance. The other ends of the wires are slidably connected to each other by eyes so that in open position the bail portions of the two wires form a transversely flattened loop, or noose, of sufficient areal extent to permit the entry of the flattened triangular head of a pit viper. Once the head has progressed through the noose to the point where the base of the triangle has moved beyond the vertical "plane" of the noose, reverse movement of the head will cause the transverse shoulders to engage the nether side of the noose, causing it to contract and firmly hold the snake's head.

In most instances, it is not necessary to bait the trap, a good lead-fence, or wall, along which the snake might naturally follow and thus be led into the trap, being sufficient. In the absence of such conditions, or even in addition to them, rodent odors (urine, feces or a synthesized odor) can advantageously be used, the odors being placed about three inches beyond the trigger loop, or noose; in other words, adjacent the closed end of the cage.

As will be understood, the cage confines only the head of the snake, but since the cage is tethered to a stake, or the like, the snake is not only unable to escape, but the dangerous fangs are rendered incapable of being used since the head is totally encaged by a metallic barrier.

DESCRIPTION OF THE PREFERRED EMBODIMENT

Figure 1:
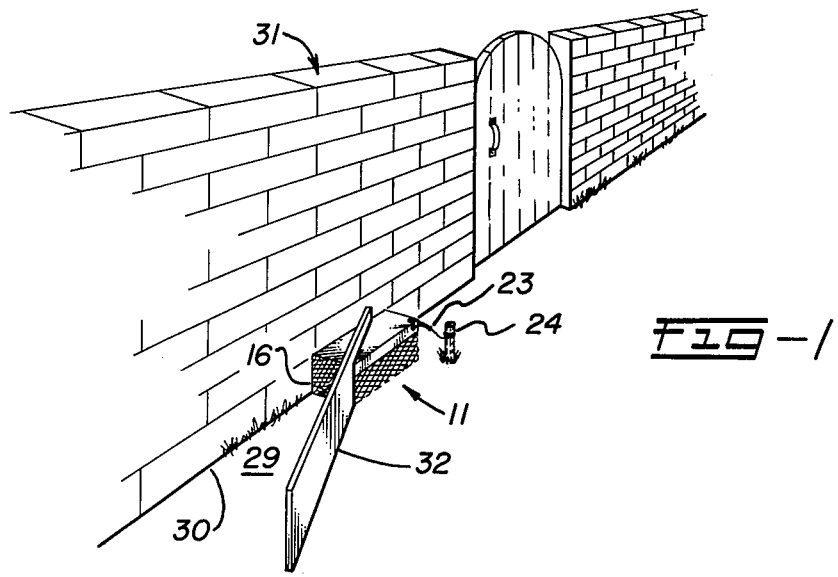
FIG. 1 is a perspective view showing a typical installation in which the trap is located at the base of a fence, with a lead fence cooperatively arranged to guide a snake toward the trap.

While the pit viper trap of the invention is susceptible of numerous physical embodiments, depending on the environment and requirements of use, several embodiments similar to the one disclosed herein have been made, tested and used, and have performed with eminently successful results.

The pit viper trap of the invention, generally designated by the reference numerall 11, comprises an elongated cage 12, preferably constructed of sheet or expanded metal or a combination of the two.

The cage includes a horizontal elongated bottom 14 and a pair of opposite vertical side walls 15 conveniently bent up from the bottom 14.

The front end 16 of the cage is unenclosed but the after end 17 is closed to prevent egress from the cage 12, the after end 17 being bent up from the bottom 14.

Figure 2:
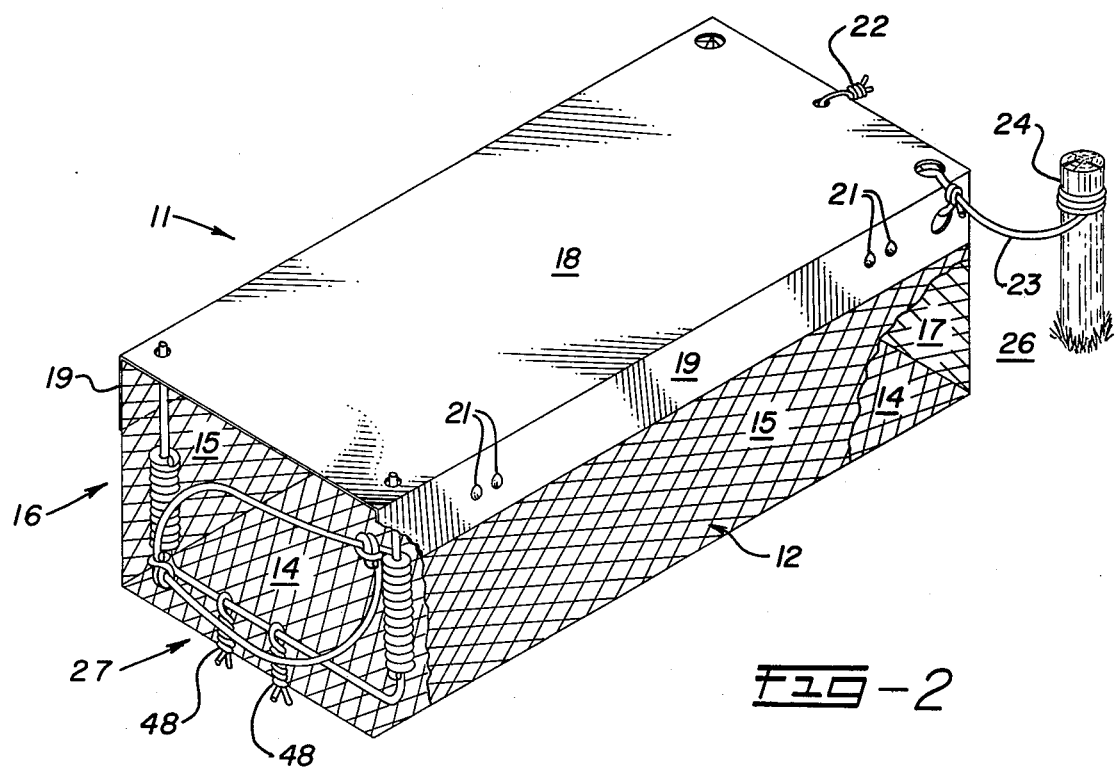
FIG. 2 is a perspective view of an assembled trap tethered to a stake, with portions of the proximal and distal corners broken away to reveal the underlying construction.

In the embodiment disclosed in FIGS. 1 and 2, the main body of the cage is fabricated from expanded metal, such as expanded aluminum. In order to increase the strength of the trap a cover 18 with depending skirts 19, of 20 gauge aluminum sheet, for example, is provided.

The cover 18 is riveted to the cage body 12 by rivets 21 extending through the skirts 19 and underlying cage walls 15 and a wire twist 22 fastens the after end of the cover 18 to the top of the end wall 17.

In order to prevent the trapped snake from escaping, the cage is tethered, as by a wire 23, or stout cord, to a solid object, such as a stake 24 driven securely into the ground 26.

Located within the entryway provided by the open front end 16 is a noose 27, or trigger loop, through which the snake's head 28 protrudes as it encounters the cage located in the path 29 of the snake in search of its prey.

As most clearly appears in FIG. 1, the trap 11 can advantageously be located along the base 30 of a small mesh or solid fence 31 where snakes are want to travel. A lead fence 32 helps to funnel into the path 29 any snakes which have strayed outwardly from the fence base 30. In some installations, the use of rodent odors (urine, feces or synthesized odor) may be advantageous, the odor being placed about 3" ahead of the noose.

As will be appreciated, the trap 11 can be used in many different environments, depending on terrain, location of outbuildings, trees, wood piles, rocks, bushes, rodent burrows, banks of ponds, gardens, and the like; in other words, wherever snakes are likely to be found. In some instances it is helpful to install two traps, facing in opposite directions, along a frequented snake pathway, such as along a barn wall or at opposite ends of a pile of lumber. Placing a trap in the opening of a rodent burrow is often productive of success.

The noose 27, or trigger loop, comprises a pair of curved wires acting in concert to tighten when any portion of the loop is urged in a direction away from the closed end of the trap, i.e. in a left-hand direction when viewed as in FIG. 2.

Figure 3:
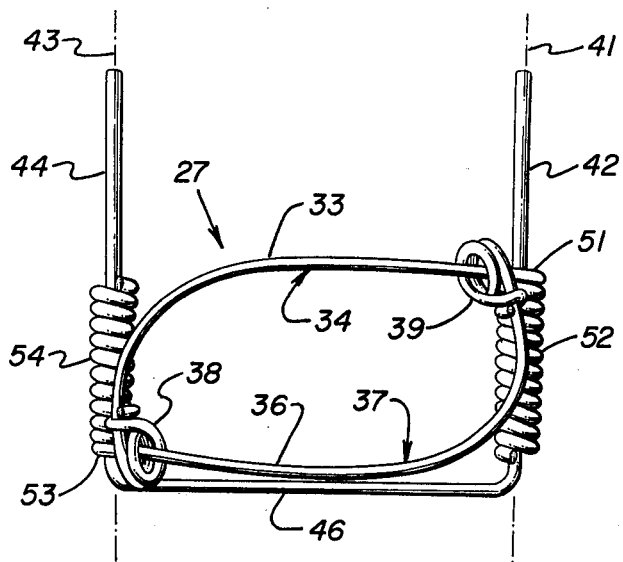
FIG. 3 is a front elevational view, to an enlarged scale, showing the noose in open position.
Figure 5:
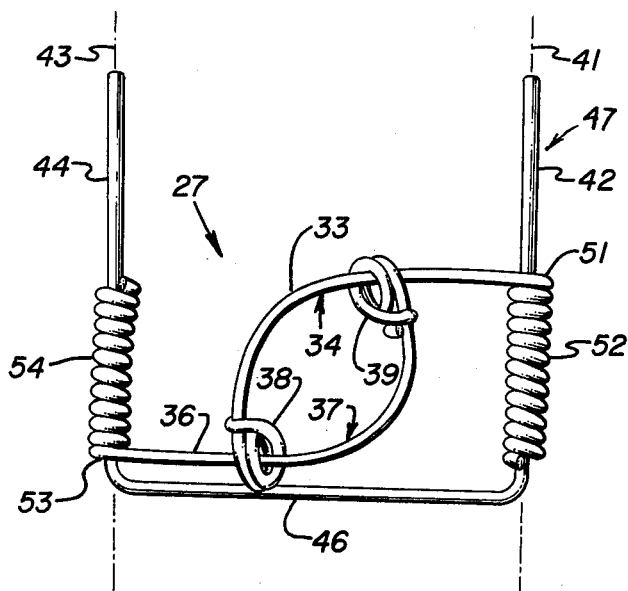
FIG. 5 is a front elevational view similar to FIG. 3 but with the noose in closed position; and, FIG. 6 is a top plan view similar to FIG. 4, but with the noose in closed position, the triangular head and adjacent neck portion of a pit viper being indicated by broken lines.

The upper and left-hand portion of the loop 27 is formed by the curved bail 33 of an upper wire 34 while the lower and right-hand portion of the loop is defined by the curved bail 36 of a lower wire 37, as is most clearly seen in FIGS. 3 and 5.

The lower, left-hand end of the upper wire 34 is wound to form an eye 38 loosely encircling the adjacent portion of the lower wire 37. In comparable fashion, the upper, right-hand end of the lower wire 37 is formed with an eye 39 loosely encompassing the upper wire 34. Relative sliding, but guided motion is thereby afforded.

The upper wire 34 is mounted for pivotal movement about a vertical axis 41 coincident with the axis of a vertical wire post 42 and the lower wire 37 is similarly mounted for movement about a vertical axis 43 coincident with the axis of a vertical wire post 44. The bottom ends of the vertical wire posts 42 and 44 are connected by a horizontal cross-wire 46, thereby forming a U-shaped wire framework 47. The framework 47 can be made from 16 gauge stiff brass wire and is secured in place at the bottom of the cage by suitable twisted wire supports 48 while the upper ends of the posts are confined since they protrude through registering openings 49 in the top cover 18, as seen in FIG. 2.

Figure 4:
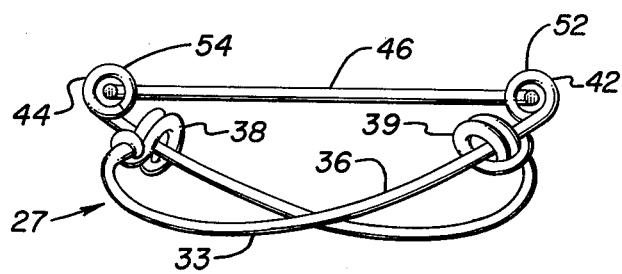
FIG. 4 is a top plan view, to an enlarged scale, showing the noose in open position.

The upper right-hand end 51 of the upper bail 33 merges into the upper end of a hollow helical coil 52 loosely encircling the right-hand wire post 42, whereas the lower left-hand end 53 of the lower bail 36 merges into the lower end of a similar hollow coil 54 loosely encircling the left-hand wire post 44. The coils are not affixed to the posts. Thus the bails 33 and 34 can readily swing forwardly and backwardly about the vertical axes 41 and 43 as appears in comparisons of the top plan views in FIGS. 4 and 6.

As can also be clearly seen in FIGS. 3-6, as the bails 33 and 36 swing rearwardly (away from the far, closed end of the cage), the eyes 38 and 39 slide along the respective bails 36 and 33, the over all effect being to close the noose 27 by a smooth cooperating movement of both bails.

Figure 6:
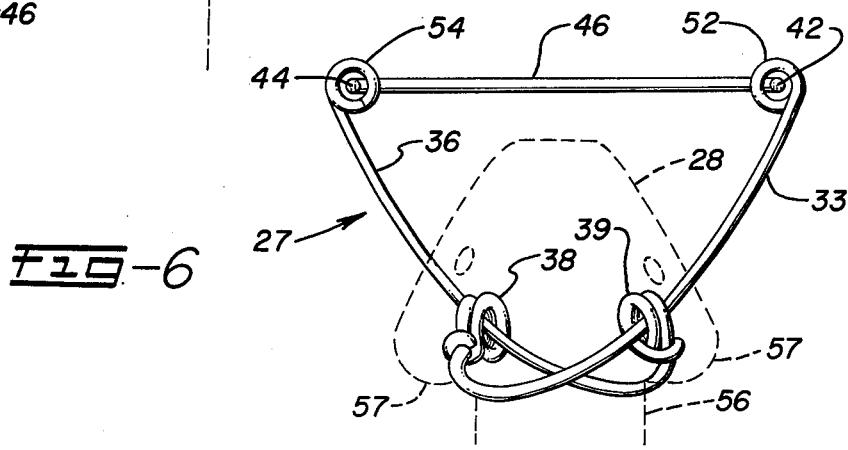

Thus, whereas the noose 27 in open position, as in FIGS. 2 and 3 can be on the order of ¾" in height and 1½" in transverse width, sufficient to allow a pit viper's head 28 to pass through, the noose 27 quickly contracts to a much smaller size, as appears in FIGS. 5 and 6, when the snake attempts to withdraw and in so doing engages the back side of either of the bails 33 or 36 and causes them to pivot rearwardly and reduce the areal extent of the noose 27 to approximately that of the cross sectional size of the snake's neck 56, as appears in FIG. 6.

The shoulders 57 formed by the uniquely long base of a pit viper's triangular head thereby traps the snake. The snake is unable to extricate itself since if it moves ahead it is barred by the rear wall 17 and if it attempts to back out its head will be caught in the noose 27.

The construction of the trap is sturdy and the tether line 23 prevents the trap from being carried away by the snake.

It can therefore be seen that I have provided a snake trap which is not only relatively inexpensive, yet durable but which is also desirably selective in that only venomous snakes of the pit viper type are caught, allowing snakes of all other kinds to go free.

I claim:

1. Trap for pit viper comprising:
   a. an elongated cage including at least a top and a pair of side walls, said cage being open at one end to provide ingress for the head of a pit viper and closed at the other end to prevent egress therefrom; and,
   b. noose means located at said one end of said cage for constricting the neck of a pit viper at the junction of the neck and the head following the insertion of the head through said noose means and engagement between the base of the head and the forward side of said noose means as withdrawal of the head is attempted, said noose means including a first wire and a second wire, each having a loop at one end and a bail extending to the other end, said loop of said first wire being slidably disposed on said bail of said second wire and being movable between a first location adjacent said other end of said second wire to a second location removed therefrom, said loop of said second wire being slidably disposed on said bail of said first wire and being movable between a first position adjacent said other end of said first wire and a second position removed therefrom.

2. A trap as in claim 1 further including first means connected to said cage for mounting said other end of said first wire adjacent one of said side walls and said open end of said cage for pivotal movement about a vertical axis; and, second means connected to said cage for mounting said other end of said second wire adjacent the other of said side walls and said open end of said cage for pivotal movement about a vertical axis, said bails being shaped so that in said first location of said first wire and said first position of said second wire, said bails define a horizontally and transversely elongated passageway large enough to admit the head of a pit viper, said bails in said second location of said first wire and said second position of said second wire defining a passageway having a diminished area incapable of permitting the withdrawal of the head of the pit viper through the passageway.

3. Trap for pit viper as in claim 2 further including a first vertical pin adjacent one lateral side of said open end of said cage and a second vertical pin adjacent the other lateral side of said open end of said cage; and in which said first and said second mounting means each includes a hollow helix formed on said other ends of said first wire and said second wire, said helices being mounted on the respective ones of said pins for rotation thereon.

4. Trap for pit viper as in claim 3 further including means for anchoring said cage to a fixed location.

5. Trap for pit viper as in claim 4 in which said cage includes a bottom, and in which at least said bottom and said side walls are fabricated from expanded metal.

6. Trap for pit viper as in claim 5 in which said top is fabricated from sheet metal.

* * * * *